United States Patent [19]

MacDiarmid

[11] Patent Number: 4,940,640
[45] Date of Patent: Jul. 10, 1990

[54] HIGH CAPACITY POLYANILINE ELECTRODES

[75] Inventor: Alan G. MacDiarmid, Drexel Hill, Pa.

[73] Assignee: University of Pennsylvania, Philadelphia, Pa.

[21] Appl. No.: 241,796

[22] Filed: Sep. 6, 1988

Related U.S. Application Data

[63] Continuation of Ser. No. 757,884, Jul. 23, 1985, abandoned.

[51] Int. Cl.$^5$ .............................................. H01M 4/60
[52] U.S. Cl. .................................... 429/213; 429/194; 429/50; 528/422
[58] Field of Search ............... 429/191, 194, 212, 213, 429/50; 252/182.1; 528/422

[56] References Cited

U.S. PATENT DOCUMENTS

| | | |
|---|---|---|
| 4,204,216 | 5/1980 | Heeger et al. |
| 4,222,903 | 9/1980 | Heeger et al. |
| 4,312,114 | 3/1982 | MacDiarmid et al. |
| 4,442,187 | 4/1984 | MacDiarmid et al. |

FOREIGN PATENT DOCUMENTS

| | | |
|---|---|---|
| 3443455 | 5/1986 | Fed. Rep. of Germany |
| 1519729 | 2/1967 | France |
| 94536 | 3/1968 | France |
| 2553581 | 4/1985 | France |
| 60-221964 | 11/1985 | Japan |
| 60-221973 | 11/1985 | Japan |
| 60-249265 | 12/1985 | Japan |
| 61-68864 | 4/1986 | Japan |
| 61-161673 | 7/1986 | Japan |
| 1216549 | 2/1967 | United Kingdom |

OTHER PUBLICATIONS

"Direct Current Conductivity of Polyaniline Sulfates", M. Diromedoff et al., *J. Chim. Phys. Physicochim. Biol.* 68, 1055 (1971).
"Continuous Current Conductivity of Macromolecular Materials", L-T. Ye et al., *Chim. Macromol.* 1, 469 (1970).
"Polyanilina-Based Filmogenic Organic-Conductor Polymers", D. LaBarre et al., *C. R. Acad. Sci., Ser. C.*, 269, 964 (1969).
"Studies on Organic Polymers Synthesized by Electrolytic Method (II) Secondary Battery Using Polyaniline", A. Kitani et al., *50th Meeting of the Electrochemical Society of Japan*, 1983, p. 123.
"Polyaniline as the Positive Electrode of Storage Batteries", M. Kaya et al., *Journal Denki Kagaku* 52, No. 12 (1984), pp. 847-848.
"Secondary Battery Using Polyaniline", A. Kitani et al., *51st Meeting of Electrochemical Society of Japan*, Fukuoka, Japan, Apr. 28, 1984, p. 847.
"Electrochemical Properties of Polyaniline Sulfates", F. Cristofini et al., *J. Polym. Sci., Part C*, 1346-1349 (1967).
"Electrochemical Cells Using Protolytic Organic Semiconductors", R. DeSurville et al., Electrochim. Acta, 13, 1451 (1968).
"Oligomers and Polymers Produced by Oxidation of Aromatic Amines", R. DeSurville et al., *Ann. Chim.* (Paris), 2, 5, (1967).
"Preparation, Chemical Properties, and Electrical Conductivity of Poly-N-Alkylanilines in the Solid State", D. Muller et al., *Bull. Soc. Chim. Fr.*, 4087 (1972).
"Electrochemical Study of Polyaniline in Aqueous and Organic Medium. Redox and Kinetic Properties", E. M. Genies et al., *Mol. Cryst. Liqu. Cryst.*, 121, 181 (1985).

(List continued on next page.)

*Primary Examiner*—Stephen J. Kalafut
*Attorney, Agent, or Firm*—Woodcock Washburn Kurtz Mackiewicz & Norris

[57] ABSTRACT

Electrochemical electrodes are provided having improved capacity and efficiency. In accordance with preferred embodiments polyaniline species wherein oxidation and hydrogenation levels are carefully controlled are formulated into such electrodes and into batteries and fuel cells.

11 Claims, 5 Drawing Sheets

POSSIBLE COMBINATIONS OF 1A AND 2A REPEAT UNITS

"LEUCO-EMERALDINE" BASE (i.e. 1A REPEAT UNITS ONLY)

"PROTO-EMERALDINE" BASE (1A AND 2A REPEAT UNITS)

"EMERALDINE" BASE (1A AND 2A REPEATS UNITS)

"NIGRANILINE" BASE (1A AND 2A REPEAT UNITS)

"PERNIGRANILINE" BASE (2A UNITS ONLY)

OTHER PUBLICATIONS

"Secondary Batteries Using Polyaniline", 24*th Battery Symposium in Japan*, Osaka, Japan, 1983, p. 197, A. Kitani et al.

"Recently Discovered Properties of Semiconducting Polymers", M. Jozefowicz et al., *J. Polym. Sci., Part C*, 22, 1187 (1969).

"Conductivity and Chemical Composition of Macromolecular Semiconductors", L. T. Yu et al., *Rev. Gen. Electr.*, 75, 1014 (1966).

"Relation Between the Chemical and Electrochemical Properties of Macromolecular Semiconductors", M. Jozefowicz et al., *Rev. Gen. Electr.*, 75, 1008 (1966).

"Experimental Study of the Direct Current Conductivity of Macromolecular Compounds", L-T. Yu et al., *J. Polym. Sci., Polym. Symp.*, 16, 2931 (1967).

"Conductivity and Chemical Properties of Oligomeric Polyanilines", M. Josefowicz et al., *J. Polym. Sci., Polym. Symp.*, 16, 2934 (1967).

"Products of the Catalytic Oxidation of Aromatic Amiens", R. DeSurville et al., Ann. Chim. (Paris) 2, 149 (1967).

POSSIBLE COMBINATIONS OF 1A AND 2A REPEAT UNITS

"LEUCO-EMERALDINE" BASE (i.e. 1A REPEAT UNITS ONLY)

"PROTO-EMERALDINE" BASE (1A AND 2A REPEAT UNITS)

"EMERALDINE" BASE (1A AND 2A REPEATS UNITS)

"NIGRANILINE" BASE (1A AND 2A REPEAT UNITS)

"PERNIGRANILINE" BASE (2A UNITS ONLY)

POSSIBLE COMBINATIONS OF 1A, 2A, 1S" AND 2S" REPEAT UNITS

A "LEUCO-EMERALDINE" SALT (i.e. 1A AND 1S" REPEAT UNITS)

A "PROTO-EMERALDINE" SALT (1A, 1S" AND 2S" REPEAT UNITS)

AN "EMERALDINE" SALT (1A AND 2S" REPEAT UNITS)

A "NIGRANILINE" SALT (1A, 2A AND 2S" REPEAT UNITS)

A "PERNIGRANILINE" SALT (2A AND 2S" REPEAT UNITS)

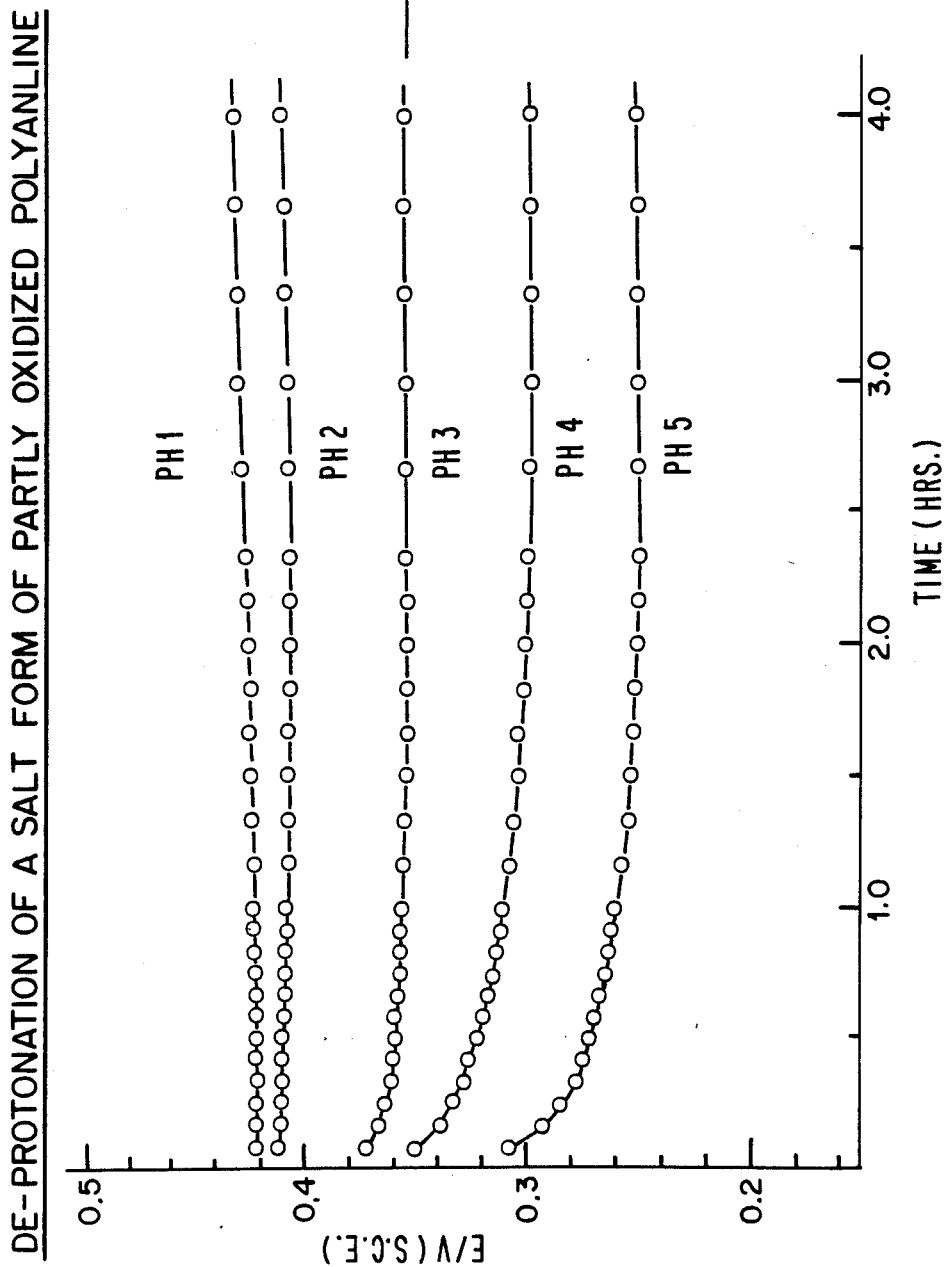

HIGH CAPACITY POLYANILINE ELECTRODES

Certain aspects of the present invention were supported by the National Science Foundation-Grants DMR-82-16718 and DMR-80-22870 and the Office of Naval Research. Certain righes have been retained by the United States Government in respect to this invention.

This is a continuation of application Ser. No. 757,884, filed Jul. 23, 1985 now abandoned.

FIELD OF THE INVENTION

This invention is directed to improved eolectrodes for use in batteries, fuel cells, sensors and other electrochemical devices. The electrodes are particularly adapted for use in aprotic electrolytes. High capacity electrodes are formed from polyaniline and related materials which permit electrochemical devices such as batteries to be prepared having capacities and efficiencies close to the theoretical maximum for such materals. Methods for energy storage are also comprehended.

BACKGROUND OF THE INVENTION

There has recently been an increased interest in electrochenistry and electrochemical phenomena of polymeric systems. See, in this regard, U.S. Pat. Nos. 4,222,903 and 4,204,216— Heeger et al. and 4,321,114 and 4,442,187— MacDiarmid et al. which are directed to the electrochemistry of certain conjugated polymers having extended conjugation in at least one backbone chain thereof. Each of the foregoing are incorporated herein by reference.

In U.S. patent application Ser. No. 620,446 filed Jun. 14, 1984, assigned to the assignee of this invention and incorporated herein by reference, certain electrochemical systems employing polyanilines as electrodes materials are described. Each of these systems have aqueous or otherwise protic electrolytes. Work in that area prior to the foregoing invention did not meet with successful development of secondary batteries, fuel cells, or substantially reversible electrochemical methods, however.

Jozefowicz et al., have undertaken certain electrochemical studies of certain forms of polyaniline as an anode and cathode in aqueous solution. See, for example, French Patent No. 1,519,729; French Patent of Addition No. 94,536; U.K. Patent No. 1,216,549; "Direct Current Conductivity of Polyaniline Sulfates", M. Diromedoff, F. Hautiere-Cristofini, R. DeSurville, M. Jozefowicz, L-T. Yu and R. Buvet. *J. Chim. Phys.,  Physicoshim. Biol.,* 68, 1055 (1971); "Continuous Current Conductivity of Macromolecular Materials", L-T. Yu, M. Jozefowicz, and R. Buvet, *Chim. Macromol.* 1, 469 (1970); "Polyaniline-Based Filmogenic Organic-Conductor Polymers", d. LaBarre and M. Jozefowicz, *C. R. Acad. Sci., Ser. C,* 269, 964 (1969); "Recently Discovered Properties of Semiconducting Polymers", M. Jozefowicz, L-T. Y, J. Perichon and R. Buvet. *J. Polym. Sci., Part C,* 22, 1187 (1967); "Electrochemical Properties of Polyaniline Sulfates", F. Cristofini, R. DeSurville and M. Jozefowicz, *C. R. Acad. Sci., Ser. C,* 268, 1346 (1969); "Electrochemical Cells Using Protolytic Organic Semiconductors", R. DeSurville, M. Jozefowicz, L-T. Yu, J. Perichon and R. Buvet, *Electrochim. Acta,* 13, 1451 (1968); "Oligomers and Polymers Produced by Oxidation of Aromatic Amines", R. DeSurville, M. Jozefowicz and R. Buvet, *Ann. Chim. (Paris),* 2, 5 (1967); "Experimental Study of the Direct Current Conductivity of Macromolecular Compounds", L-T. Yu, M. Borredon, M. Jozefowicz, G. Belorgey and R. Buvet, *J. Polym. Sci., Polym. Symp.,* 16, 2931 (1967); "Conductivity and Chemical Properties of Oligomeric Polyanilines", M. Jozefowicz, L-T. Yu, G. Belorgey and R. Buvet, *J. Polym. Sci., Polym. Symp.,* 16, 2934 (1967); "Products of the Catalytic Oxidation of Aromatic Amines", R. DeSurville, M. Jozefowicz and R. Buvet, *Ann. Chim. (Paris),* 2, 149 (1967); "Conductivity and Chemical Composition of Macromolecular Semiconductors", L-T. Yu and M. Jozefowicz, *Rev. Gen. Electr.,* 75, 1014 (1966); "Relation Between the Chemical and Electrochemical Properties of Macromolecular Semiconductors", M. Jozefowicz and L-T. Yu, *Rev. Gen. Electr.,* 75, 1008 (1966); "Preparation, Chemical Properties, and Electrical Conductivity of Poly-N-Alkylanilines in the Solid State", D. Muller and M. Jozefowicz, *Bull. Soc. Chim. Fr.,* 4087 (1972). Jozefowicz et al. employed a reduced form and an oxidized form of polyaniline, neither of which was analyzed or characterized in any way as to their chemical composition, as the anode and cathode respectively in one normal sulphuric acid (pH-O). They observed that such an electrochemical cell could be charged and discharged for two consecutive cycles.

Repetition of the disclosures of Jozefowicz has shown that the methods of Jozefowicz do not lead to substantial reversibility of electrochemistry involving polyaniline or to electrochemical cells having sufficient reversibility as to provide practical utility for secondary battery use.

Several papers have been published describing the use of "polyaniline" as a cathode in rechargeable battery cells in conjunction with a lithium anode in non-aqueous electrolytes.

In "Electrochemical Study of Polyaniline in Aqueous and Organic Medium. Redox and Kinetic Properties", E. M. Genies, A. A. Syed and C. Tsintavis, *Mol. Cryst. Liq. Cryst.,* 121, 181 (1985), polyaniline film was synthesized in concentrated (presumably aqueous) HF solution. Charge density and other properties were determined in the HF solution. It is stated that it was very important "that the process retains some acidity in the polymer. If the polymer is completely neutralized, it becomes almost electroinactive and an insultator. In organic solvent, the residual acidity of the PANI remains in the polymer."

In "Secondary Batteries Using Polyaniline", *24th Battery Symposium in Japan,* Osaka, Japan, 1983, p. 197, A. Kitani, M. Kaya and K. Sasaki report on certain lithium/polyaniline battery structures. No final oxidizing potential or information leading to a knowledge of the degree of protonation of the polyaniline film used in the $Li/LiClO_4$ propylene carbonate/polyaniline battery is given, however. It is only stated that a potential of 0.8 V (versus a standard calomel electrode) in a 1 M aniline/12 M $HClO_4$ solution was used in synthesizing the polyaniline. It has now been determined that this potential, in the presence of aniline, produces a green film, not a blue-purple (highly oxidized) film of the type formed if no aniline is present. In the presence of aniline at this potential the polyaniline is constantly being synthesized. In the absence of aniline, the only electrochemical reaction is the more extensive oxidation of the polyaniline. Kitani et al. state that they washed the film with water. This would cause an unknown and uncontrolled amount of deprotonation of the polyaniline salt, depending on the washing conditions.

In "Studies on Organic Polymers Synthesized by Electrolytic Method (II) Secondary Battery Using Polyaniline", A. Kitani, Y. Hiromoto and K. Sasaki, 50th *Meeting of the Electrochemical Society of Japan*, 1983, p. 123, it is stated that polyaniline film was synthesized by repeated potential cycling between —0.2 V and 0.8 V (no reference electrode is reported) in 0.1 M aniline/0.2 M HClO$_4$. No reference is made as to the final potential at which the film was oxidized before it was used in a Li/LiClO$_4$(PC)/polyaniline cell. Also no mention is made as to how the product was washed. A pellet of polyaniline which was electrochemically synthesized in a powder form at 1.2 V "was also tested". This was apparently used only in aqueous electrolytes.

"Polyaniline as the Positive Electrode of Storage Batteries", M. Kaya, A. Kitani and K. Sasaki, 51st *Meeting of the Electrochemical Society of Japan*, Fukuoka, Japan, Apr. 28, 1984, P. 847, deals only with polyaniline in aqueous electrolytes, although in Table I electrochemical properties of a cell employing a Li anode are reported for comparative purposes.

Studies in aqueous electrolytes are described in "Secondary Battery Using Polyaniline", A. Kitani, M. Kaya, and K. Sasaki, 51st *Meeting of the Electrochemical Society of Japan*, Fukuoka, Japan, Apr. 28, 1984, p. 847.

OBJECTS OF THE INVENTION

It is an object of this invention to provide electrochemical electrodes employing polyaniline species which are capable of very high capacity and efficiency.

Another object is to provide batteries, fuel cells, sensors and the like employing these improved electrodes.

A further object is to prepare such electrodes, batteries, fuel cells and other electrochemical articles.

Yet another object is to attain methods for energy storage employing the foregoing batteries.

These and other objects will become apparent from a review of the present specification.

BRIEF DESCRIPTION OF THE DRAWINGS

FIG. 5 depicts deprotonation of a salt form of a partially oxidized polyaniline.

SUMMARY OF THE INVENTION

Figure 1:
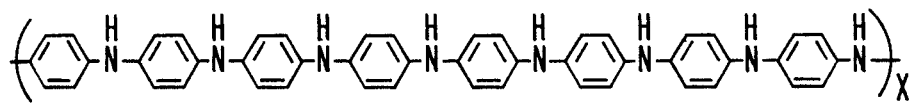
FIGS. 1 and 2 depict structures of some aniline polymer species.
Figure 1:
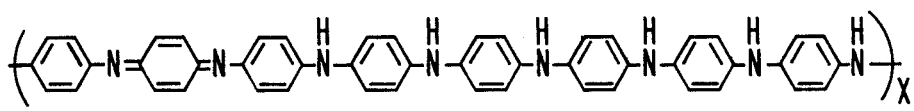
Figure 1:
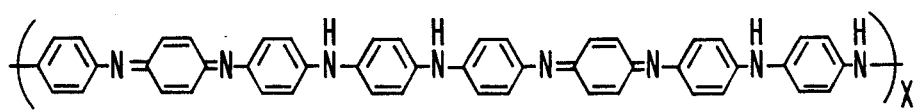
Figure 1:
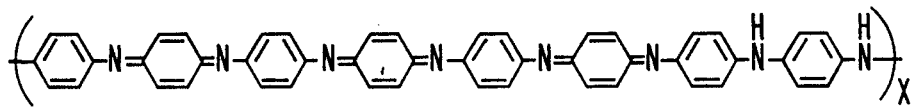
Figure 1:
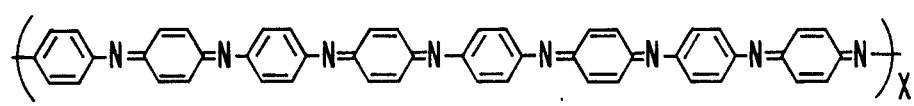

It has now been found that electrochemical cells can now be prepared having greatly improved capacities and efficiencies. Such cells comprise anode active means, cathode active means, and aprotic electrolyte. At least one of the anode and cathode means is caused to consist essentially of a polyaniline species wherein each nitrogen of the polymer chain of the polyaniline species is associated with one, but only one, hydrogen atom. The foregoing electrochemical cells may be particularly adapted into secondary batteries, fuel cells, sensors and the like. In accordance with preferred practice, the polyaniline specie comprises a cathode of a secondary battery or fuel cell while the preferred anode in such systems is an alkaline metal or alkaline earth metal such as lithium.

In accordance with certain preferred embodiments of the invention, the electrochemical cells function by reversible oxidation and reduction of the polyaniline species forming the electrode. Thus, it is preferred that the polyaniline electrode species be reversibly transformable from an oxidized species having the formula:

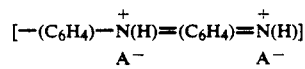

to a reduced species having the formula:

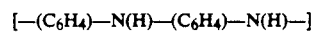

wherein A$^-$ is a counterion, preferably from the electrolyte. It has been found that when electrochemical cells are prepared having polyaniline species electrodes which are capable of undergoing the foregoing, reversible transition, that high capacities and efficiencies result. This is in counter distinction to electrochemical cells formed from other forms of polyaniline. In accordance with another embodiment of the invention, methods for reversible energy storage such as in a secondary battery are comprehended which rely upon the cyclical oxidation and reduction of the foregoing electrodes in an aprotic electrolyte.

DETAILED DESCRIPTION OF THE INVENTION

The term "polyaniline" has been used for many years to describe a number of ill-defined materials resulting from the chemical or electrochemical oxidative polymerization of aniline, $C_6H_5NH_2$. The invention described herein is based in part on the concept that polyaniline polymers may be described as a combination, in any desired relative amounts, of certain of the following idealized repeat units, depending on the experimental conditions to which the polyaniline is exposed.

Completely Reduced Polyaniline Base Repeat Unit 1A

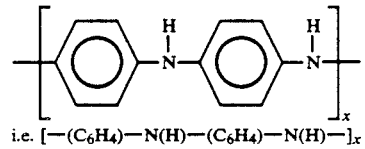

i.e. $[-(C_6H_4)-N(H)-(C_6H_4)-N(H)-]_x$

Completely Oxidized Polyaniline Base Repeat Unit 2A

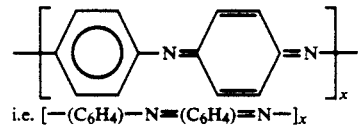

i.e. $[-(C_6H_4)-N=(C_6H_4)=N-]_x$

Both "1A" and "2B" units may, under appropriate experimental conditions, be partly or completely protonated to give the corresponding "salt" repeat units.

Completely Reduced Polyaniline Monoprotonated Salt Repeat Unit, 1S'

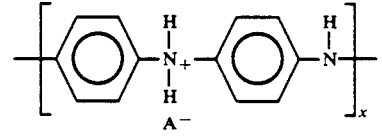

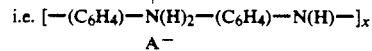

i.e. $[-(C_6H_4)-\overset{+}{N}(H)_2-(C_6H_4)-N(H)-]_x$
       $A^-$ where A$^-$ is an anion.

Completely Reduced Polyaniline Diprotonated Salt Repeat Unit, 1S''

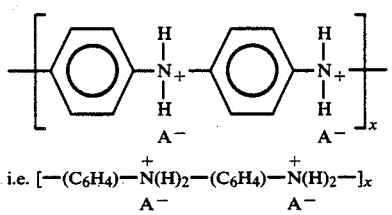

i.e. $[-(C_6H_4)-\overset{+}{N}(H)_2-(C_6H_4)-\overset{+}{N}(H)_2-]_x$
   $\quad\quad\quad\quad A^-\quad\quad\quad\quad\quad A^-$

Completely Oxidized Polyaniline Monoprotonated Salt Repeat Unit, 2S'

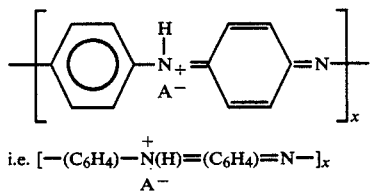

i.e. $[-(C_6H_4)-\overset{+}{N}(H)=(C_6H_4)=N-]_x$
   $\quad\quad\quad\quad A^-$

Completely Oxidized Polyaniline Diprotonated Salt Repeat Unit, 2S''

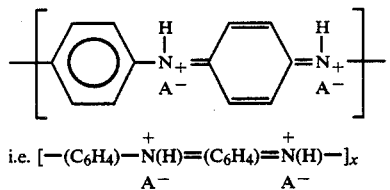

i.e. $[-(C_6H_4)-\overset{+}{N}(H)=(C_6H_4)=\overset{+}{N}(H)-]_x$
   $\quad\quad\quad\quad A^-\quad\quad\quad\quad\quad A^-$ In the present context the repeat units represented by the terms 1A, 2A, 1S', 1S'', 2S' and 2S'' should not be regarded as necessarily excluding various isomeric units such as:

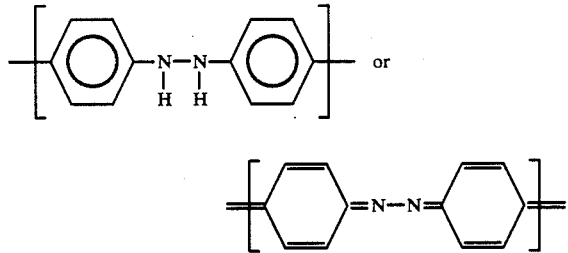

or their protonated derivatives or branched chain units such as:

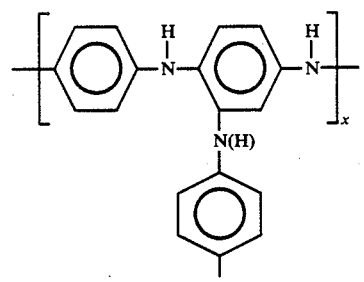

or their oxidized and/or protonated derivatives which, as will be recognized by those persons skilled in the art, may also be formed to some extent during the synthesis of polyaniline.

Green and Woodhead claimed to have isolated octomers approximating the empirical compositions below. A. G. Green and A. E. Woodhead, *J. Chem. Soc.*, 97, p. 2388 (1910); 101, p. 1117 (1912). The empirical compositions do not necessarily represent the actual structural formulas of the materials; indeed, it might be expected that different repreat units would be distributed more or less uniformly throughout a given polymer chain. Terminal ($C_6H_5$), $-NH_2=NH$, OH, etc. groups were postulated. While we believe the materials are polymers, we retain, for convenience, the old nomenclature to represent the composition of the octomeric repeat units.

"Leuco-emeraldine" Base (i.e. 1A repeat units only)

$[-(C_6H_4)-N(H)-(C_6H_4)-N(H)-]_x$

"Proto-emeraldine" Base (1A and 2A repeat units)

$[[-(C_6H_4)-N(H)-(C_6H_4)-N(H)]_3-](C_6H_4)-N=(C_6H_4=N-]]_x$

Emeraldine Base (1A and 2A repeat units)

$[[-(c_6H_4)-N(H)-(C_6H_4)-N(H)_2]-[(C_6H_4)-N=(C_6H_4)=N--]_2]_x$

Nigraniline Base (1A and 2A repeat units)

$[[-(C_6H_4)-N(H)-(C_6H_4)-N(H)]-[(C_6H_4)-N=(C_6H_4)=N-]_3]_x$

Pernigraniline (2a units only)

$[-(C_6H_4)-N=(C_6H_4)=N-]_x$

The smallest number of ($C_6H_4$)—N moieties which can be used in a repeat unit as suggested above which will permit interconversion between the above five compositions is eight. Possible combinations of "1A" and "2A" base units are depicted diagrammatically in FIG. 1. No attention is paid to bond angles, etc., in this representation.

Figure 2:
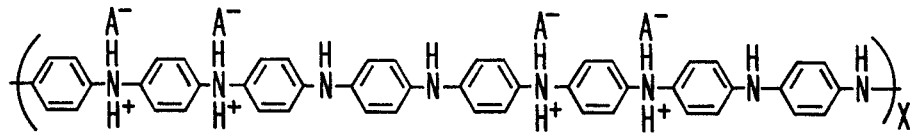
Figure 2:
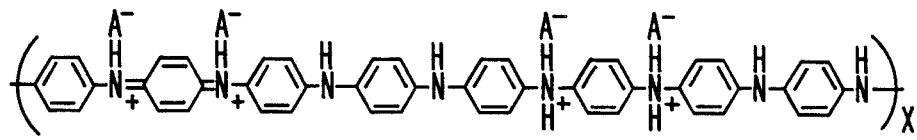
Figure 2:
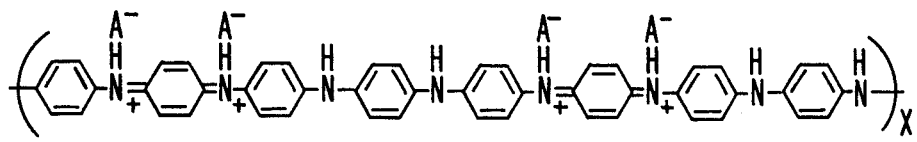
Figure 2:
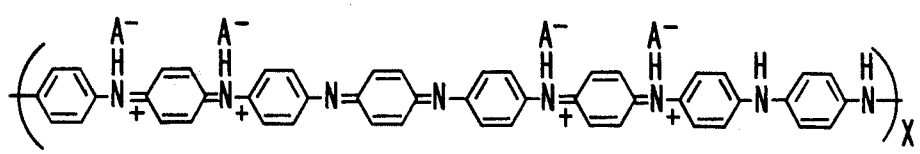
Figure 2:
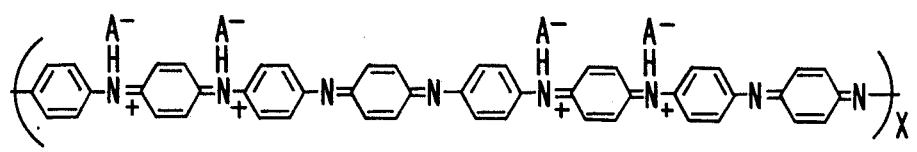

Each of the repeat units in the foregoing polymer structures can also be converted to one or the other of its salt forms under appropriate conditions. By treatment with an appropriate acid the five base forms of polyaniline depicted in FIG. 1 can, in principle, be converted to the corresponding five "salt" forms given in FIG. 2. In principle, the extent of protonation can be greater or less than that shown in FIG. 2, depending on the experimental conditions employed in the protonation reactions. IT will be obvious to one skilled in the art that it is possible to formulate many combinations other than those depicted in FIGS. 1 and 2. The combinations given are to be considered as exemplary rather than exhaustive.

Figure 3:
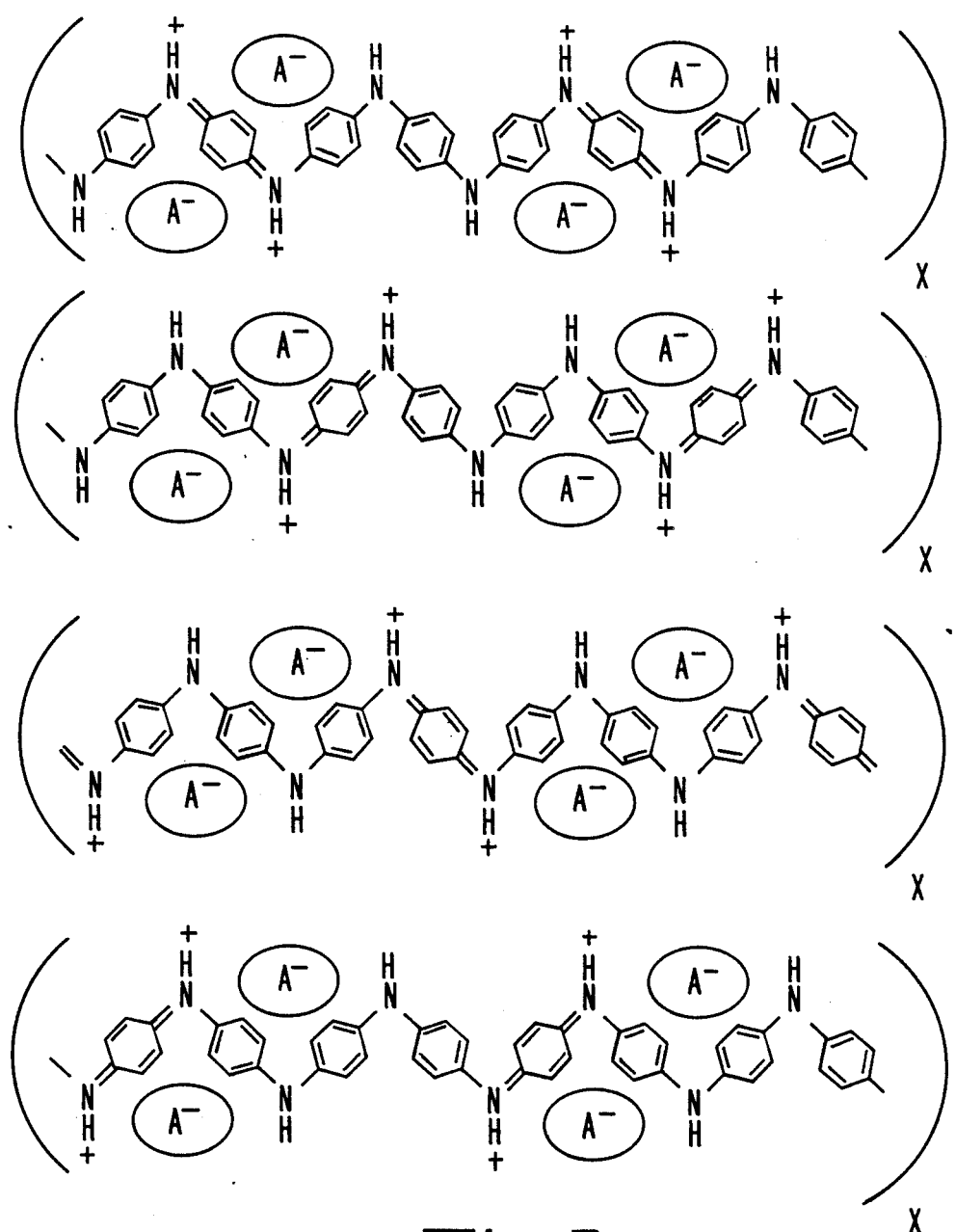
FIG. 3 illustrates possible resonance structures of an emeraldine salt.

A semi-structural depiction of an emeraldine salt is given in FIG. 3. It is believed that an A⁻ion may be shared by more than one (NH) bond. In FIG. 3, for example, each (NH) unit may be considered as being associated with 0.5 positive charge. This emeraldine salt, if it consists of equal contributions from each of the four reasonance forms, would exhibit partial benzenoid/quinoid character as to each of the $C_6H_4$ groups, and partial double bond character as to all of the C—N bonds. Since imine N atoms are expected to be less basic than amine N atoms, it is expected that the amine N atoms in a polymer containing both 1A and 2A repeat units would be preferentially protonated, e.g.:

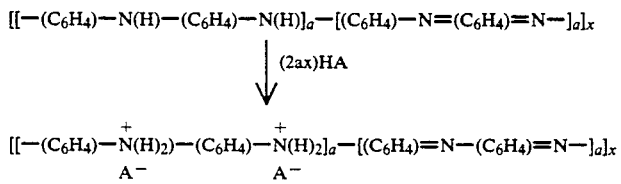

However, the emeraldine salt given in FIG. 3 has been postulated as containing protonated imine N atoms, viz.:

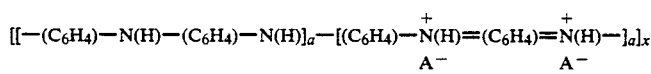

This is believed to result from the delocalization of charge and accompanying equilization of bond lengths accompanying a structure derived from resonance forms suggested in FIG. 3. This is believed to predominate over the expected imine and amine base strengths as observed in simple molecules. The same general effect is believed also to apply when the number of 1A and 2A groups of a polymer chain are not equal. However, as the relative number of imine N atoms increases (relative to the number of amine N atoms) their ease of protonation will decrease since the protonation of an imine nitrogen is assisted by the presence of an adjacent amine nitrogen group.

Figure 4:
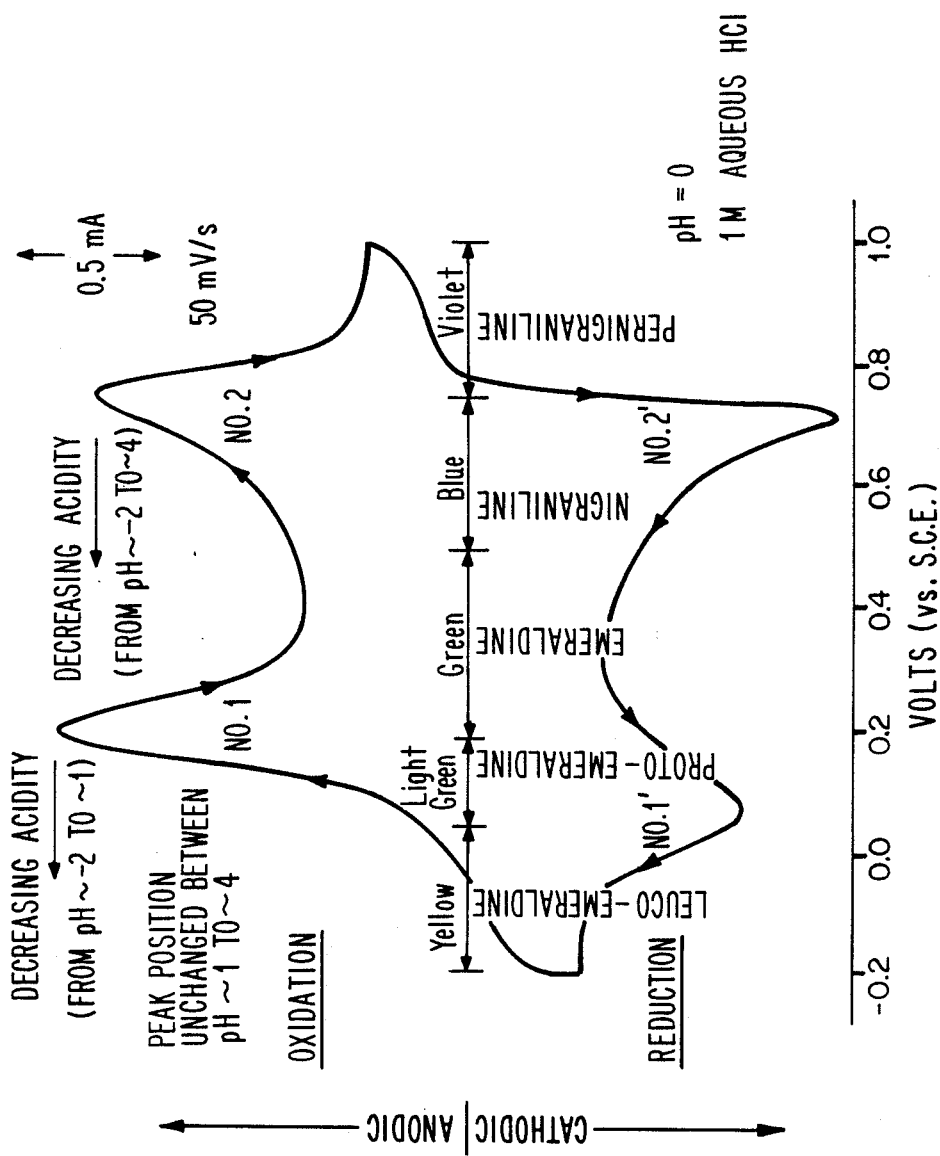
FIG. 4 is a cyclic voltammogram for a polyaniline powder.

This is shown clearly by the cyclic voltammogram of FIG. 4 where the potential of No. 1 and No. 1' peak is insensitive to pH in the range from approximately 1 to approximately 4(during the short time during which the cyclic voltammogram is taken) while the potential of No. 2 and No. 2' peak is sensitive to the pH in the same pH range from approximately 1 to approximately 4. The sensitivity of peak No. 2 in FIG. 4 shows that HA dissocaites readily from the polymer in its more highly oxidized state while no such dissociation is experimentally observable for the less highly oxidized polymer charactertized by peak No. 1.

The emeraldine salt presented in structural detail in FIG. 3, may be synthesized in at least two different ways. The salt (but not the compounds from which it is derived) shows metallic conductivity ($\sigma$=approximately 5S/cm). Thus, the emeraldine salt may be synthesized by protonic acid treatment of emeraldine base (Example 3). It may also be made through electrochemical oxidation of leuco-emeraldine base (Example 1).

The colors of the polyaniline bases and salts changes continuously and smoothly according to the number of oxidized and reduced polyaniline groups present in the polymer. This is illustrated by the cyclic voltammogram of chemically-synthesized polyaniline powder (in 1 M aqueous HCl) given in FIG. 4. It can be seen that in this electrolyte the color becomes increasingly more violet with increasing degree of oxidation. The approximate compositions corresponding to a given color as reported by Green, et. al. are given in that figure. It should be noted that, because of the absence in 1A, 1S' and 1S" of repeat units of chromophoric groups related to conjugated quinoid-type segments, polyaniline can act in certain ways as its own "redox indicator". Thus a pale yellow (colorless in thin films) material is characteristic of the reduced 1A, 1S' and 1S" repeat units; green-blue-violet colors are indicative of the presence of 2A, 2S', 2S" groups.

The present invention relies upon the fact that the discharge of a battery cell consisting of a polyaniline cathode and, a metal electrode such as lithium in an aprotic electrolyte such as, for example, a LiClO$_4$/propylene carbonate (PC) electrolyte, the fundamental electrochemical reaction occuring at the polyaniline cathode involves the reduction of a

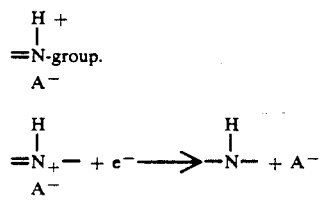

The reaction occuring at the Li anode is:

giving the net discharge reaction:

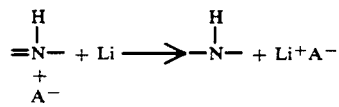

The charge reactions are the reverse of the foregoing equations. Charge and discharge reactions between a completely reduced form of polyaniline consisting entirely of 1A repeat units and a completely oxidized form of polyaniline consisting of completely oxidized 2S" repeat units would then be:

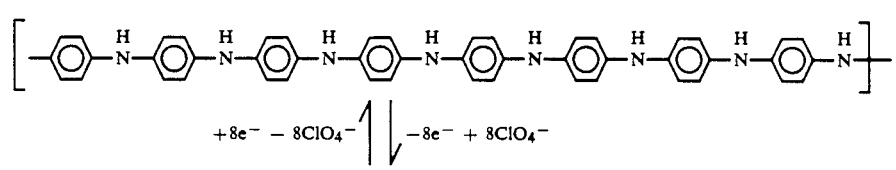

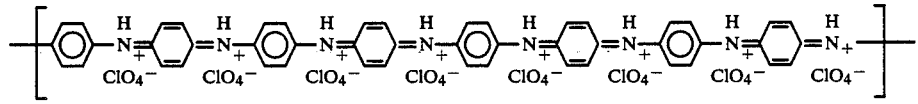

Such reactions would involve maximum utilization of the electrochemical capacity of the polyaniline, one electron per $(C_6H_5)$—N unit. The polyaniline electrode initially placed in the cell could consist of either the completely oxidized or completely reduced forms shown above.

It was not previously known that in order to obtain full use of the electrochemical capacity of a polyaniline electrode in a non-protic electrolyte it is necessary to control both the degree of oxidation and the degree of protonation of the polyaniline electrode.

A necessary distinction must be made between the different types of nitrogen-associated hydrogen atoms in polyaniline. A nitrogen atom attached to a hydrogen atom which is itself not associated with an $A^-$ counterion is said to be a "hydrogenated" nitrogen atom, as in, for example, a 1A repeat unit:

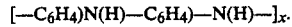

A nitrogen atom attached to a hydrogen atom which is associated with an $A^-$ counterion is added to be "protonated", as is, for example, a 2S' repeat unit:

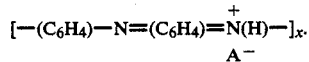

In certain instances, as in, for example, a 1S" unit, the nitrogen atoms will be both hydrogenated and protonated:

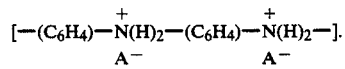

Full capacity of the polyaniline could also be realized if the polyaniline electrode placed in the cell had, for example, the composition:

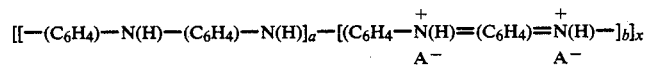

since after one initial electrochemical reduction it would have the composition:

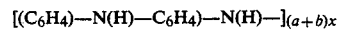

or after one initial electrochemical oxidation it would have the composition:

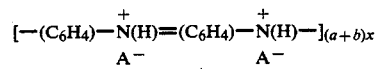

Subsequent charge/discharge reactions would then utilize the full capacity of the polyaniline.

If, however, the polyaniline electrode initially placed in the battery did not have all the N atoms either hydrogenated or protonated, as in, for example:

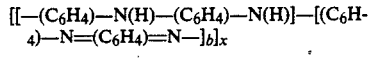

then complete oxidative/reductive, i.e. charge/discharge cycling between

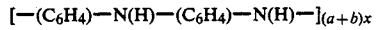

and

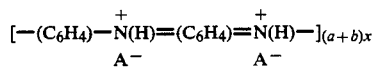

would not be possible since there would be no way in which the necessary $(2b)x$ hydrogen atoms would be supplied to the 2A repeat units. If, for example, $a=b$, i.e. emeraldine base, then only 50% of the maximum capacity could be obtained, at best.

No clear description of the electrochemical processes which occur during the charge or discharge cycles of polyaniline has been described heretofore. Moreover, it has not been previously recognized that only certain chemical forms of polyaniline may be used in the construction of polyaniline electrodes if maximal electrochemical capacity of the polyaniline (based on its weight) is to be realized when it is used in a battery. It has now been discovered that only certain forms of polyaniline can be employed in constructing polyaniline electrodes for use in a battery or other electrochemical cell employing a non-protic electrolyte if the full electrochemical capacity of the polyaniline is substantially to be realized. It has been discovered that the electrochemical capacity of a given electrochemically-grown polyaniline film can be drastically modified simply by converting it to different chemical forms prior to its use in an electrochemical cell employing a non-protic electrolyte. The electrochemical reactions occuring during the charge/discharge processes in cells of the above type are now also known.

In view of the foregoing, it has now been found that in order to obtain preferred, maximum utilization of capacity of a polyaniline electrode in a battery comprising a non-protic electrolyte, the polyaniline electrode placed in the battery must satisfy the condition that each nitrogen atom in the polymer chain have one and only one hydrogen atom associated with it.

Less ideally, but still within the scope of this invention, it is possible to use a form of polyaniline where there are two hydrogen species attached to the same N atom as in, for example, a 1S' repeat unit. During the first charge (oxidation) cycle, HA will be liberated:

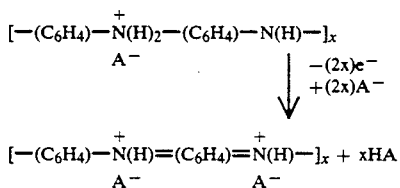

The oxidized 2S" repeat unit of polyaniline so formed can function satisfactorily during subsequent charge and discharge cycles, but the HA liberated may ultimately diffuse to the Li anode and react chemically with it. This may likely be avoided as an operating problem, however, through careful construction of the battery.

The experiments hereinafter demonstrate the criticality of these criteria and are in excellent agreement with expected values. It should be stressed that the compositions of the "starting" forms of polyaniline given in FIG. I are formal and approximate since it is not yet precisely known what potential is necessary to synthesize a polymer corresponding exactly to the chemical composition of any particular form such as an emeraldine base or an emeraldine salt. The potentials necessary to synthesize a given composition will vary according to the pH (if synthesized in aqueous solution) or the nature of the electrolyte (if synthesized in a non-protic electrolyte). Also the time needed to obtain uniform macroscopic composition by diffusion through an electrochemically grown film has not yet been determined with precision. It is believed, however, that persons of ordinary skill in the art will have no difficulty in understanding and repeating the example.

It is believed that the polyaniline electrode need not necessarily be oxidized to its maximum extent when the battery is being charged. For example, if the composition of the polyaniline electrode placed in the battery were:

$$[[-(C_6H_4)-N(H)-(C_6H_4)-N(H)]_a-[(C_6H_4-N=(C_6H_4)=N-]_b]_x$$

the 2A repeat units i.e. the "b" segments would still be electrochemically inactive even if the 1A repeat units i.e. the "a" segments are only partially utilized electrochemically. Any electrochemically inactive form of polyaniline adds to the "dead wright" of the polyaniline electrode and reduces its electrochemical capacity per unit weight, however, and is therefore less preferred.

It should also be noted that polyaniline salt forms can also be deprotonated readily such as by washing in solutions of certain pH's greater than the pH of the solution in which the salt was synthesized. For example, electrochemically synthesized polyaniline was held at 0.42 V (vs. a standard calomel electrode, SCE) in an aqueous 1 M HCl solution (pH approximately 0) to produce a polymer having a composition approximating an emeraldine salt. The polymer was then placed in dilute aqueous HCl solutions of pH=1.0, 2.0, 3.0, 4.0 and 5.0 and its $V_{oc}$ was measured (vs. SCE) at intervals. The results are given in FIG. 5 and show the rapid deprotonation of the polymer. The rate of deprotonation increases with increasing pH. This is interpreted as deprotonation of N atoms in the polymer. For example:

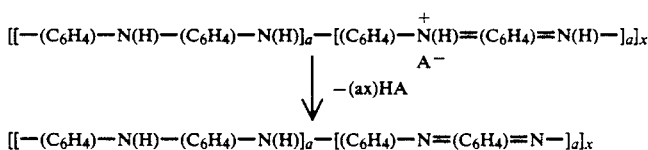

The reduction potential of the polyaniline electrode, based on the reduction reaction

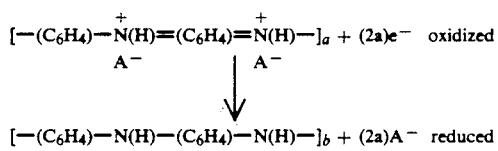

is given by the Nernst equation:

$$E = E^o + \frac{RT}{nF} \ln \frac{\text{oxidized}}{\text{reduced}}$$

Since the potential becomes smaller as the pH increases, the ratio of the 2S" to 1A units must become smaller, as will, i.e. 2S" are being deprotonated to less highly protonated or nonprotonated units, depending on the pH of the solution.

If spontaneous deprotonation of some of the N atoms of the more highly oxidized forms of the polyaniline should occur in non-protic electrolytes, e.g.:

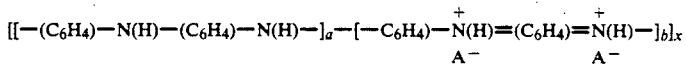

to give

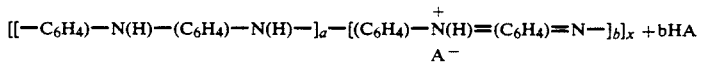

and/or

-continued

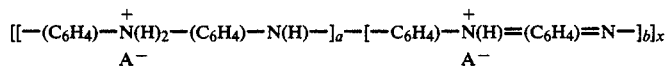

then this spontaneous deprotonation may be inhibited by using an electrolyte having a different acid strength from propylene carbonate, by adding controlled amounts of protic solvents to the non-protic solvent used in the electrolyte, by using a polymeric or oligomeric anion as $A^-$, by choosing an $A^-$ such that HA is insoluble in the electrolyte, by adding to the polymer a proton-releasing or absorbing species, such as, for example, an amine $NR_3$ (of appropriate base strength) and/or $(HNR_3)^+A^-$ which would control or eliminate deprotonation.

The polyaniline species useful in the practice of this invention include all polymeric species containing backbone chains having repeating units

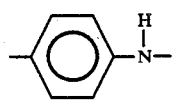

and thus include alkyl, aryl, alkaryl and aralkyl substituted aniline polymers as well as other modifications. While such materials have not yet been examined, it is believed that species having subunits such as

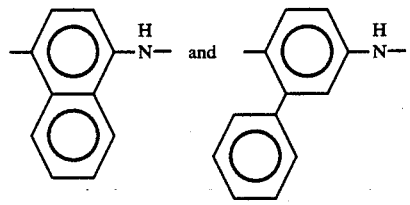

may also be useful. Heteroatomic substituents are also possibly useful.

The particular forms of the foregoing polyanilines and modified polyanilines which are preferred for the preparation of electrochemical electrodes in accordance with the invention are those wherein each nitrogen of the polymer chain has one but only one hydrogen atom associated with it. Such association may be either hydrogenation or protonation or combinations of both overall in the polymer. Accordingly, polymers formed from 1A and 2S" units are preferred.

Polymers wherein more than one hydrogen atom is associated with some or all of the polymer chain nitrogens can likely also be useful but are less preferred. This is due to the need to eliminate hydrogen species upon oxidation as discussed above.

It will be understood that a description of the molecular structure and formula of an individual polymer is necessarily imprecise since it is difficult to control the precise stoichiometry of redox and protonation reactions. Notwithstanding this, it is believed that those of ordinary skill in the art will understand that the requirement that the chain nitrogen atoms of a polyaniline have one but not more than one hydrogen atom is clear in a practical and preparative sense. That is, such definition permits a small percentage of polymer chain nitrogens to have more or less than one hydrogen atom providing the polymer species functions in accordance with the present invention. The effect of increasing percentages of nonconformance with the chain nitrogen to hydrogen ratio is to decrease electrochemical performance or to produce unwanted hydrogen species in the electrolyte; neither effect is desirable although neither is necessarily harmful in practice when evidenced in minor degree.

In view of the foregoing, the requirement that each chain nitrogen have one hydrogen atom in association and that the electrode active materials "consist essentially of" such form is to be interpreted in accordance with practical considerations attending electrochemical cell manufacture. In general, if less than about 10%, preferably less than about 5% and even more preferably less than about 2% of the chain nitrogen atoms have more or less than one hydrogen atom in association, then the polymer will be considered to meet the foregoing requirement.

When a polyaniline is employed as a cathode active material suitable anodes include polyaniline itself, separately or in a unitary mass, together with many other materials. Such anode materials must be stable in the cell environment, must be ionizable within the context of the electrochemical reaction and must have a reduction potential more negative than the cathode, for polyaniline, generally less than +0.64 volts. Such materials may be found, inter alia, from review of the *Handbook of Chemistry and Physics*, CRC Co., 52nd ed. at p. D-111 et seq. Exemplary materials include Cd, Pb, Zn, Mn, Ni, Sm, Ti, Mg and materials such as hydrazine.

When the polyaniline is used as an anode, polymers may serve as cathode including p-doped polyacetylene and polyparaphenylene, organics such as benzoquinone, $O_2$, $H_2O_2$ and metal oxides having, generally, positive reduction potentials (greater than the polyaniline anode). Of course the materials must be stable but ionizable within the context of the cell. Such metal oxides include $MnO_2$, $PbO_2$, $Ni_2O_3$ and others.

A wide variety of electrolytes may be employed which have effective stability, mobility and activity in the electrochemical cells of the invention. Selection of suitable electrolytes including solvent and solvent components is within the skill of the routineer who will be able to select such materials to be compatible with the electrodes and the aprotic cell environment. Preferred electrolytes include alkali metal salts in propylene carbonate and other aprotic solvents.

The employment of electrochemical electrodes in secondary batteries, fuel cells, sensors and other electrochemical cells is well within the level of skill in the art from a review of this specification. A number of uses for such electrodes are found in *Handbook of Batteries and Fuel Cells*, Linden ed., McGraw-Hill (1984) which is incorporated herein by reference.

The present invention is illustrated by the following examples which are not intended to be limiting.

EXAMPLE 1

Synthesis of Polyaniline Films Polymerized on Platinum Substrates

A standard 3-electrode configuration was used to prepare polyaniline films. An SCE was used as the reference electrode, Pt foil was used as the counterelectrode (total area=1 cm$^2$), and Pt foil was adopted as the working electrode (total area=1 cm$^2$) in 20 ml of 1M HClO$_4$. The working electrode was fixed 0.5 cm from the counterelectrode. One mililiter of distilled aniline was added to the electrolyte and stirred until the aniline was dissolved (pH approximately 0). Potential limits were set at −0.20 V and +0.75 V vs. SCE and potential scanning at 50 mvs$^{-1}$ between the two limits was begun. Scanning was stopped when the film reached the desired thickness (approximately 45 scans, i.e. 30 minutes). The last scan was stopped at 0.4 V on the oxidation cycle. The resulting film was green to the eye at a potential of 0.4 V, corresponding to the approximate composition of an emeraldine salt form of polyaniline.

EXAMPLE 2

Preparation of Electrolyte

An electrolyte solution of 1M LiClO$_4$ in propylene carbonate was prepared. Anhydrous lithium perchlorate (LiClO$_4$) (Alfa- Ventron, Danvers, Mass.) was purified by weighing out 31.92 gm in a dry box and transferring it to a 500 ml round bottomed flask. The flask was then removed from the dry box and attached to a vacuum line (pressure approximately 2 microns). The flask was heated gently under dynamic vacuum until the LiClO$_4$ melted. After cooling to room temperature (approximately 10 min) the LiClO$_4$ was melted two more times under identical conditions. Propylene carbonate (C$_4$H$_6$O$_3$) (Aldrich Chemical, Milwaukee, Wis.) was purified by spinning band vacuum distillation. A typical distillation involved approximately 300 ml of propylene carbonate in a one meter nickel spinning band column (Nester-Faust) equipped with a variable ratio reflux head (set to a two to one ratio). After evacuating the system the temperature was increased to 100° C. The first 50 ml of propylene carbonate collected were discarded. The next 200 ml were collected and stored for use in an evacuated bulb. The propylene carbonate and the flask containing the LiClO$_4$ were transferred to the dry box. The electrolyte was then prepared by dissolving the LiClO$_4$ in 300 ml of propylene carbonate under dry box conditions.

EXAMPLE 3

Pre-Treating and Electrochemical Conditioning of Polyaniline Electrode (A) Synthesis of Desired Composition of "Polyaniline" Electrode Polyaniline film on a Pt substrate was synthesized as described in Example 1. The film was then immersed in 1M HClO$_4$ for 12 hours in air to ensure that the polyaniline was homogeneously in a salt form. After 48 hours of pumping in dynamic vacuum, a 3-electrode electrochemical cell was constructed in the dry box. Both reference and counter electrodes were Li metal. Li was scraped with a knife in the dry box prior to use to remove any oxides from its surface. The working electrode was polyaniline film on the Pt foil. The three electrodes were immersed in a 20 ml beaker containing 10-15 ml of 1M LiClO$_4$/propylene carbonate electrolyte. The distance between the polyaniline electrode and the counter electrode was approximately 1 cm. The open circuit potential, $V_{oc}$, of the polyaniline immediately after construction was 3.51 V vs. Li/Li$^+$.

(B) Electrochemical Conditioning of the Polyaniline Electrode

The polyaniline electrode was pre-conditioned. The film was first reduced by applying a constant potential of 2.5 V vs. Li/Li$^+$ (approximately −0.79 V vs. SCE) for 10 min. The potential limits were then set at 2.0 V and 3.2 V. A 50 m V/s scan rate was next applied to the cell, i.e. 48 sec for one complete oxidation/reduction cycle. The upper limite was successively increased to 4.0 V by 0.2 V increments (2–3 cycles at each voltage increment). The cyclic voltammogram obtained was completely reversible for each of these cycles.

Color changes were evidenced from essentially colorless (approximately 2.5 V vs. Li/Li$^+$) to green (approximately 3.1 V vs. Li/Li$^+$) to blue (approximately 3.7 V vs. Li/Li$^+$) in the anodic (oxidative) scan.

EXAMPLE 4

Polyaniline (1A Form) Synthesized Electrochemically in a Propylene Carbonate Electrolyte (A) Synthesis of Desired Composition of "Polyaniline" Electrode The polyaniline film from Example 3 was reduced in the dry box by applying a potential of 2.5 V vs. Li/Li$^+$ (approximatly −0.79 V vs. SCE) to the film for one hour. This resulted in the production of an essentially colorless polyaniline believed to comprise 1A forms. The film was then rinsed in 0.1M NH$_4$OH for 5 hours in an argon filled glove bag to ensure removal of all traces of HClO$_4$ from the film and its conversion to pure 1A form. After 48 hours of pumping in a dynamic vacuum, a three electrode electrochemical cell was constructed in the dry box as described in Example 3. The open circuit potential of the polyaniline electrode was 2.90 V vs. Li/Li$^+$ (approximately −0.39 V vs. SCE).

(B) Electrochemical Properties of the Electrode

First, an initial potential of 2.5 V vs. Li/Li$^+$ was applied to the polyaniline electrode to ensure it was in the completely reduced form 1A. A potential scan of 50 m V/s was then applied between 2.5 V and 3.2 V. Two complete cycles were performed. The upper limit was then increased to 4.0 V by increments of 0.2 V. The amount of charge in and out during oxidation and reduction between 2.5 V and 4.0 V was obtained by integrating the I-V curve using the "cut and weigh" method. During the anodic (oxidative) scan, the color changed from essentially colorless and transparent (at 2.5 V) to green (at 3.1 V) to blue (at 3.7 V). $5.44 \times 10^{-3}$ coulombs were passed during the oxidation cycle. $5.21 \times 10^{-3}$ coulombs were passed during the reduction cycle. The coulombic efficiency was therefore 95.8%.

EXAMPLE 5

Polyaniline (Approximate Emeraldine Salt Form) (Synthesized Electrochemically and Chemically)

(A) Synthesis of Desired Composition of "Polyaniline" Electrode

The polyaniline film from Example 4 was oxidized in the propylene carbonate (PC)/LiClO$_4$ electrolyte by applying a potential of 3.30 V* vs. Li/Li$^+$ to the polymer electrode for 5 minutes to convert it to an approximate composition corresponding to a green emeraldine salt form. The film was then rinsed with 1M HClO$_4$, in which PC is soluble, and was then washed with 150 ml of fresh 1M HClO$_4$ for 12 hours (with no exclusion of air) to ensure that it was in a homogeneously protonated salt form. After 48 hours pumping in dynamic vacuum, it was placed in the PC/LiClO$_4$/Li cell and the open circuit potential of the polyaniline electrode was found to be 3.50 V. The increase in potential from 3.30 V to 3.50 V is believed to be due to partial oxidation of the polyaniline during the HClO$_4$/air treatment.

(B) Electrochemical Properties of the Electrode

The cell was recylced using the same procedure described in Example 4. $5.81 \times 10^{-3}$ coulombs was passed during the oxidation cycle. $5.43 \times 10^3$ coulombs was passed during the reduction cycle. The coulombic efficiency was therefore 93.5%.

EXAMPLE 6

Polyaniline 1A Form Synthesized Electrochemically in an Aqueous Electrolyte 100 ml of 1M ZnCl$_2$ solution and 100 ml of distilled water were both deaerated by passing argon through the solutions for 45 minutes. The polyaniline electrode from Example 5 was first washed with approximately 10 ml of the ZnCl$_2$ electrolyte to remove the PC electrolyte. It was then placed in 100 ml of fresh equeous ZnCl$_2$ and reduced by applying a potential of 0.7 V vs. Zn/Zn$^{2+}$ (i.e. approximately 2.98 V vs. Li/Li$^+$) to the polymer electrode for approximately 30 minutes. This converted it to the essentially colorless 1A form. The experiment was carried out in an argon filled glove bag. The ZnCl$_2$ electrolyte solution was found to have a pH of approximately 4.5. Zn was used as a counter electrode during reduction of the polyaniline. The potential then rose to 0.80 V vs. Zn$^{2+}$/Zn during 10 seconds due to removal of polarization and related effects and then remained constant at this value for 5 minutes before it was washed with distilled water. After 48 hours pumping in a dynamic vacuum, a three electrode electrochemical cell was constructed in the dry box as described in Example 3. The open circuit potential of polyaniline was found to be 2.90 V vs. Li/Li$^+$ (approximately $-0.39$ V vs. SCE).

(B) Electrochemical Properties of the Electrode

First an initial potential of 2.5 V vs. Li/Li$^+$ was applied to the polyaniline electrode. Then a potential scan with 50 mv/s scan rate between 2.5 V and 3.5 V was applied to the polymer electrode for 4 cycles. The upper limit was then increased to 4.0 V. $5.26 \times 10^{-3}$ coulombs were passed during the oxidation cycle. $5.09 \times 10^{-3}$ coulombs were passed during the reduction cycle. The coulombic efficiency was therefore 96.8%.

EXAMPLE 7

Approximate Emeraldine Base Form of Polyaniline Synthesized Electrochemically and Chemically (A) Synthesis of Desired Composition of "Polyaniline" Electrode The polyaniline film from Example 6 was oxidized at 3.5 V for 5 minutes vs. Li/Li$^+$ in a dry box in PC electrolyte to convert it to an approximate emeraldine salt form. The film was then rinsed with dilute NH$_4$OH (0.1M) to remove PC electrolyte. It was then washed with 50 ml of dilute NH$_4$OH solution for 6 hours. The color of the polyaniline film changed from green to blue as it was converted from an approximate emeraldine salt form to an approximate emeraldine base form. It should be noted that even water will deprotonate 2S' and 2S" forms of polyaniline; however, the NH$_4$OH solution was used as a precautionary measure to ensure complete deprotonation. After 24 hours pumping in dynamic vacuum, a three electrode electrochemical cell was constructed in a dry box as described in Example 2. The open circuit potential of the polyaniline was 2.81 V vs. Li/Li$^+$. As can be seen from FIG. 5, the potential of a polyaniline film having a composition approximately that of emeraldine, decreases significantly with decreasing protonation.

(B) Electrochemical Properties of the Electrode

First, an initial potential of 2.5 V vs. Li/Li$^+$ was applied to the polyaniline electrode for 10 minutes to reduce it to the maximum possible extent. It had a blue color whereas the emeraldine salt form at the same potential is essentially colorless. This is indicative of the presence of non-reduced quinoid groups. A potential scan with 50 m V/s scan rate between 2.5 V and 3.5 V was applied to the polymer electrode for 6 cycles. The upper limit was then increased to 4.0 V. During the anodic (oxidative) scan, the color changed from blue (at 2.5 V) to green-blue (at 3.2 V). $3.89 \times 10^{-3}$ coulombs were passed during the oxidation cycle. $3.68 \times 10^3$ coulombs were passed during the reduction cycle. The coulombic efficiency was therefore 94.6%.

EXAMPLE 8

Approximate Emeraldine Salt Form Synthesized Electrochemically and Chemically (A) Synthesis of Desired Composition of "Polyaniline" Electrode The polyaniline film from Example 7 (i.e. approximate emeraldine base) was oxidized by applying a potential of 3.5 V vs. Li/Li$^+$ to the polymer electrode for 5 minutes. It was then converted to the approximate emeraldine salt form using the same HClO$_4$ treatment as described in Example 5. The open circuit potential of the polyaniline was 3.53 V vs. Li/Li$^+$.

(B) Electrochemical Properties of the Electrode

The polyaniline was then cycled between 2.5 V and 4.0 V (vs. Li/Li$^+$). At 2.5 V it was essentially colorless while at 4.0 V it was blue. $5.66 \times 10^{-3}$ coulombs were passed during the oxidation cycle. $5.29 \times 10^{-3}$ coulombs were passed during the reduction cycle. The coulombic efficiency was therefore 93.5%.

EXAMPLE 9

Approximate Emeraldine Base Form Synthesized Electrochemically and Chemically (A) Synthesis of Desired Composition of "Polyaniline" Electrode The polyaniline film from Example 8 was oxidized at 4.0 V vs. Li/Li$^+$ for 3 minutes in a dry box in the PC electrolyte. It was then converted to the approximate emeraldine base form using the same NH$_4$OH treatment as described in Example 7. The open circuit potential of the polyaniline electrode in the cell was 2.82 V vs. Li/Li$^+$.

(B) Electrochemical Properties of the Electrode

The polyaniline was then cycled between 2.5 V and 4.0 V (vs. Li/Li$^+$). $3.16 \times 10^{-3}$ coulombs were passed during the oxidation cycle. $2.92 \times 10^{-3}$ coulombs were passed during the reduction cycle. The coulombic efficiency was therefore 92.4%.

change in the number of coulombs involved from those listed.

| Example | $Q_{out}$ (Coulombs) (Reduction) | $Q_{in}$ (Coulombs) (Oxidation) | $Q_{out}/Q_{out}$ #5 | Approximate Composition of Polyaniline used |
|---|---|---|---|---|
| 4 | $5.21 \times 10^{-3}$ | $5.44 \times 10^{-3}$ | 96.0% | $[-(C_6H_4)-N(H)-(C_6H_4)-N(H)-]_{2a}$ |
| 5 | $5.43 \times 10^{-3}$ | $5.81 \times 10^{-3}$ | 100.0% | An emeraldine salt $[-(C_6H_4)-N(H)-(C_6H_4)-N(H)\frac{1}{a}-(C_6H_4)-\overset{+}{N}(H)=(C_6H_4)=\overset{+}{N}(H)-]_a$ $\quad\quad\quad\quad\quad\quad\quad\quad\quad\quad\quad\quad\quad\quad\quad\quad A^- \quad\quad\quad\quad\quad A^-$ |
| 6 | $5.09 \times 10^{-3}$ | $5.26 \times 10^{-3}$ | 93.7% | $[-(C_6H_4)-N(H)-(C_6H_4)-N(H)-]_{2a}$ |
| 7 | $3.68 \times 10^{-3}$ | $3.89 \times 10^{-3}$ | 67.8% | An emeraldine base $[-(C_6H_4)-N(H)-(C_6H_4)-N(H)\frac{1}{a}-(C_6H_4)-N=(C_6H_4)=N-]_a$ |
| 8 | $5.29 \times 10^{-3}$ | $5.66 \times 10^{-3}$ | 97.4% | An emeraldine salt $[-(C_6H_4)-N(H)-(C_6H_4)-N(H)\frac{1}{a}-(C_6H_4)-\overset{+}{N}(H)=(C_6H_4)=\overset{+}{N}(H)-]_a$ $\quad\quad\quad\quad\quad\quad\quad\quad\quad\quad\quad\quad\quad\quad\quad\quad A^- \quad\quad\quad\quad\quad A^-$ |
| 9 | $2.92 \times 10^{-3}$ | $3.16 \times 10^{-3}$ | 53.8% | An emeraldine base $[-(C_6H_4)-N(H)-(C_6H_4)-N(H)\frac{1}{a}-(C_6H_4)-N=(C_6H_4)=N-]_a$ |

| Example | Approximate Composition of Reduced Form (at 2.50 V) | Approximate Composition of Oxidized Form (at 4.0 V) |
|---|---|---|
| 4 | $[-(C_6H_4)-N(H)-(C_6H_4)-N(H)-]_{2a}$ | $[-(C_6H_4)-\overset{+}{N}(H)=(C_6H_4)=\overset{+}{N}(H)-]_{2a}$ $\quad\quad\quad A^- \quad\quad\quad\quad\quad A^-$ |
| 5 | $[-(C_6H_4)-N(H)-(C_6H_4)-N(H)-]_{2a}$ | $[-(C_6H_4)-\overset{+}{N}(H)=(C_6H_4)=\overset{+}{N}(H)-]_{2a}$ $\quad\quad\quad A^- \quad\quad\quad\quad\quad A^-$ |
| 6 | $[-(C_6H_4)-N(H)-(C_6H_4)-N(H)-]_{2a}$ | $[-(C_6H_4)-\overset{+}{N}(H)=(C_6H_4)=\overset{+}{N}(H)-]_{2a}$ $\quad\quad\quad A^- \quad\quad\quad\quad\quad A^-$ |
| 7 | $[-(C_6H_4)-N(H)-(C_6H_4)-N(H)\frac{1}{a}-(C_6H_4)-N=(C_6H_4)=N-]_a$ | $[-(C_6H_4)-\overset{+}{N}(H)-(C_6H_4)-\overset{+}{N}(H)\frac{1}{a}-(C_6H_4)-N=(C_6H_4)=N]_a$ $\quad\quad\quad A^- \quad\quad\quad\quad\quad A^-$ |
| 8 | $[-(C_6H_4)-N(H)-(C_6H_4)-N(H)-]_{2a}$ | $[-(C_6H_4)-\overset{+}{N}(H)=(C_6H_4)=\overset{+}{N}(H)-]_{2a}$ $\quad\quad\quad A^- \quad\quad\quad\quad\quad A^-$ |
| 9 | $[-(C_6H_4)-N(H)-(C_6H_4)-N(H)\frac{1}{a}-(C_6H_4)-N=(C_6H_4)=N-]_a$ | $[-(C_6H_4)-\overset{+}{N}(H)-(C_6H_4)-\overset{+}{N}(H)\frac{1}{a}-(C_6H_4)-N=(C_6H_4)=N]_a$ $\quad\quad\quad A^- \quad\quad\quad\quad\quad A^-$ |

It should be noted that in Experiment 7, the polyaniline was first oxidized at 3.5 V before treatment with NH$_4$OH. This is consistent with more 2A units being formed in the present experiment than in Experiment 7, resulting in a smaller capacity in this experiment. This is consistent with the effect that the higher the oxidation potential employed, the smaller the capacity.

EXAMPLE 10

Relative Capacity of Different Polyaniline Forms

The amount of charge out during the cathodic scan of polyaniline in different forms as described in Examples 4 to 9 is tabulated below. All samples were oxidized from 2.5 V to 4.0 V (vs. Li) to give $Q_{in}$, i.e. the charge involved in the oxidation (charge) cycle. Then they were reduced from 4.0 V to 2.5 V vs. Li to give $Q_{out}$, i.e. the charge involved in the reduction (discharge) cycle. All experiments were carried out under essentially identical conditions. In each of Examples 4-9, the recycling was conducted about 5 times. There was no significant

What is claimed is:

1. An electrochemical cell comprising anode active means, cathode active means and aprotic electrolyte at least one of said anode and cathode means consisting essentially of polyaniline species wherein each nitrogen of the polymer chain is associated with one, but only one, hydrogen atom.

2. The cell of claim 1 wherein said polyaniline species comprises the cathode means.

3. The cell of claim 2 wherein said anode active means comprises an alkalai or alkaline earth metal.

4. The cell of claim 1 wherein said polyaniline species consists essentially of subunits selected from the group consisting of:

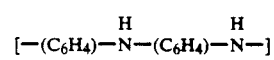

and

-continued

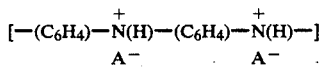

where A⁻ is a counterion.

5. The cell of claim 1 wherein said polyaniline species is reversibly oxidizable to the formula

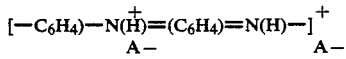

where A⁻ is a counterion, and is reversibly reducible to the formula

[—(C₆H₄)—N(H)—(C₆H₄)—N(H)—].

6. The cell of claim 1 adapted to function as a secondary battery.

7. The cell of claim 1 adapted to function as a fuel cell.

8. An electrochemical electrode consisting essentially of polyaniline species wherein each nitrogen of the polymer chain is associated with one, but only one, hydrogen atom.

9. The electrode of claim 8 cyclable between oxidized and reduced forms wherein the oxidized form has the formula:

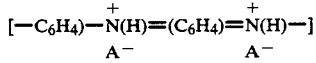

and the reduced form has the formula:

[—(C₆H₄)—N(H) (C₆H₄)—N(H)—].

10. The electrode of claim 8 in contact with an aprotic electrolyte.

11. A method of reversible energy storage comprising providing an electrode in an aprotic electrolyte and cyclically oxidizing and reducing said electrode between oxidized formula

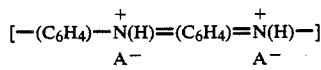

and reduced formula

[—(C₆H₄)—N(H)—(C₆H₄)—N(H)—]

where A⁻ is a counterion from the electrolyte.

* * * * *

UNITED STATES PATENT AND TRADEMARK OFFICE
CERTIFICATE OF CORRECTION

PATENT NO. : 4,940,640
DATED : July 10, 1990
INVENTOR(S) : Alan MacDiarmid

It is certified that error appears in the above-identified patent and that said Letters Patent is hereby corrected as shown below:

In the heading: the assignee reading "University of Pennsylvania, Philadelphia, PA" should read --University Patents, Inc., Westport, CT--.

Signed and Sealed this

First Day of October, 1991

Attest:

Attesting Officer

HARRY F. MANBECK, JR.

Commissioner of Patents and Trademarks